E. CHAUDIÈRE.
VERTICAL KILN.
APPLICATION FILED AUG. 28, 1919.
1,390,884.
Patented Sept. 13, 1921.
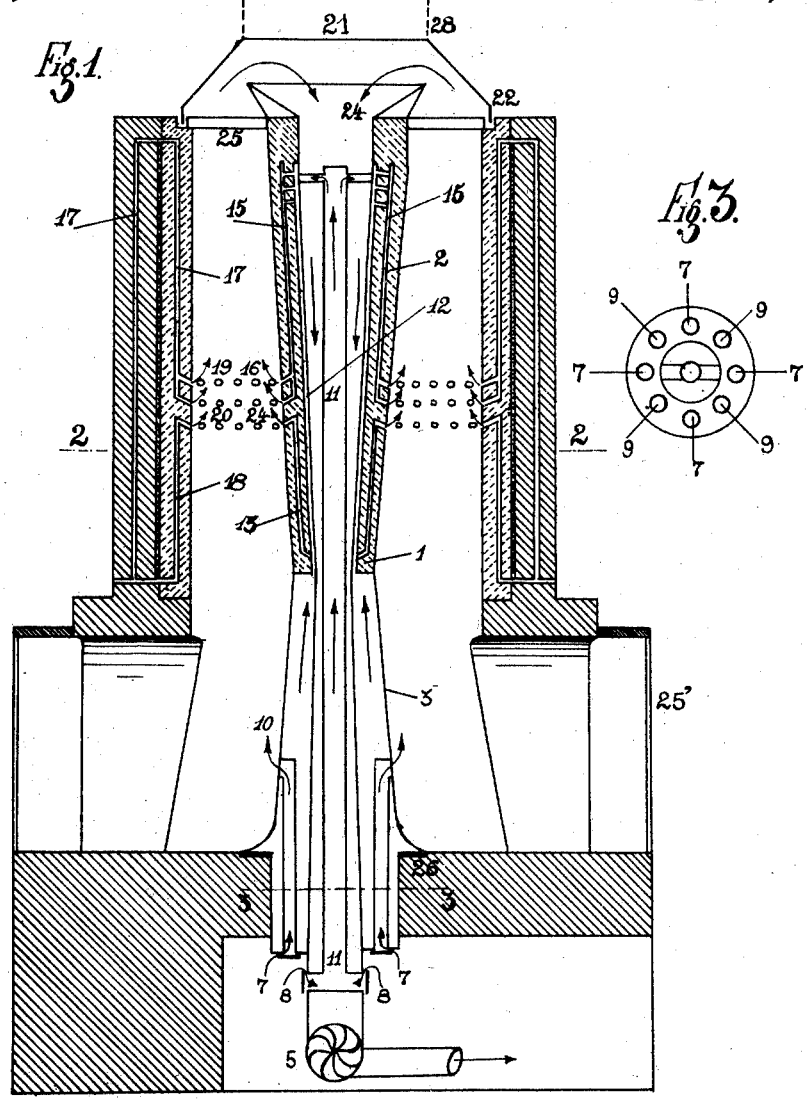
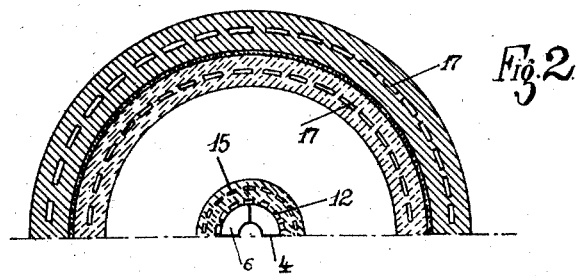
Inventor
Etienne Chaudière
by H. B. Willson & Co.
Attorneys

UNITED STATES PATENT OFFICE.

ETIENNE CHAUDIÈRE, OF PARIS, FRANCE.

VERTICAL KILN.

1,390,884.  Specification of Letters Patent.  Patented Sept. 13, 1921.

Application filed August 28, 1919. Serial No. 320,411.

*To all whom it may concern:*

Be it known that I, ETIENNE CHAUDIÈRE, engineer, a subject of the King of Belgium, and resident of Paris, in the Republic of France, have invented certain new and useful Improvements in Vertical Kilns; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to improvements in kilns of all kinds, and is more particularly adapted to be used for making lime and cement, for roasting and calcining ores, or in the construction of blast-furnaces, gas producers and the like.

These improvements result in the hereinafter mentioned advantages: the center and the periphery of the kiln or furnace are uniformly ventilated, forming of passages in the mass is prevented, the burning-zone is more firmly established, the amounts of air required are more accurately regulated, regular baking or burning is obtained, mediocre or poor fuels can be used, and the heat contained in the burned gases can be recovered in the same kiln or furnace. The consequence of these advantages is a considerable saving of fuels.

These improvements consist chiefly in the combination with kilns of all kinds, of a central core whereby hot and pure air can be admitted and distributed under the burning-zone while the heat contained in the burned gases can be recovered in the kiln itself and in the center thereof.

The appended drawings show by way of example an application of these improvements in a kiln. Figure 1 is a vertical sectional view of the kiln, Fig. 2 is a section on line 2—2 of Fig. 1, and Fig. 3 a section on line 3—3 of Fig. 1.

The kiln, of any suitable shape, comprises in the center a core 1 made up of metal and fireproof clay and forming externally two opposed truncated cones 2 and 3.

The upper truncated cone 2 is located with its larger base upward, whereby an easy descent of the charges is rendered possible, even when these (in the case of cement, for instance) are in a vitrified state or contracted by cold.

The lower truncated cone 3 is located with its larger base downward, whereby the burned mass is disintegrated and a vitrified mass is broken up by wedge action. The shape of the core can moreover be varied in accordance with the purposes in view.

The interior of the core comprises two concentric cast iron rings (see Figs. 2 and 3) connected by means of four ribs 4. The outer ring is surrounded by fireproof masonry, in which there are provided circulation and recuperation flues.

The burned gases escaping from the kiln are drawn in by a fan 5 and pass through the annular space 6 (Figs. 1 and 2) provided between the two cast iron rings. The suction produced in the kiln by the fan causes air to get in through the openings 7, 8 and 9, provided with dampers, Figs. 1 and 3.

The air which gets in at 7 escapes at 10 and cools the mass of burned materials; the air which enters at 8 rises in the central column 11 which is heated by contact with the burned gases; the air which enters at 9 (Fig. 3) rises partly along the cast iron column 12 and is warmed, while the other portion is led into the flues 13 and escapes at 14.

The warm air of the column 11 is joined to that contained in 12 and it passes through suitable openings in the flues 15 and escapes at 16 under the burning-zone after having been strongly heated in the fireproof masonry which is there brought to a very high temperature.

It will be seen that the combination of such a central core with any suitable kiln renders possible the introduction of air at the necessary places, in accordance with the materials to be treated and the openings provided in said core, to cool and to disintegrate the burned mass, to burn it regularly and to fix the position of the burning-zone by the admission of hot and pure air at the place required, to recover the lost heat and to use fuels of poor quality.

The device can be perfected by the recuperation of the heat possessed by the external walls of the kiln, by means of flues 17 and 18 into which exterior air is introduced because of the suction in the kiln, said air escaping, when warm, through openings 19 and 20. This device can be used at will together with the central core.

The upper part of the kiln is closed by means of a cover 21 with sand-joint and hoisting cables 28.

The central core is provided at its upper end with a cast iron head 24, the external diameter of which is greater than the diameter of the core, so as to direct the burnt gases toward the periphery.

The core is held in proper position by means of beams 25 at the upper end and at the lower end by a suitable securing device, for instance by means of irons 26.

The lower portion of the kiln is provided with doors 25' which are so constructed as to prevent air from entering; a circular air-tight room can also be provided there, allowing of the circulation around the discharge-openings.

It must be understoood that the dimensions of the central core, the number of air openings and of flues, the number and location of air inlets and outlets can be varied according to the various applications and the recuperation desired.

Several cores can also be used at the center of the kiln.

What I claim is:

1. The combination with a vertical kiln or furnace, in which the material to be treated is mixed with the fuel, of a central core extending the whole length of the kiln and completely surrounded by the material and the fuel, and a duct in this core disposed to take fresh air from the exterior and to distribute it at different levels in the inner part of the ring formed around the core by the material to be treated mixed with the fuel.

2. The combination with a vertical kiln or furnace, in which the material to be treated is mixed with the fuel, of a central core extending the whole length of the kiln and completely surrounded by the material and the fuel, a duct in this core disposed to take fresh air from the exterior and to distribute it at different levels in the inner part of the ring formed around the core by the material to be treated mixed with the fuel and a second duct in this core taking the burned gases at the top of the kiln and bringing them at its bottom to the chimney, these two ducts being arranged so that the air traversing the core may be preheated during its passage through the said core.

3. The combination with a vertical kiln or furnace, in which the material to be treated is mixed with the fuel, of a central core extending the whole length of the kiln and completely surrounded by the material and the fuel, a duct in this core disposed to take fresh air from the exterior and to distribute it at different levels in the inner part of the ring formed around the core by the material to be treated mixed with the fuel, a second duct in this core taking the burned gases at the top of the kiln and bringing them at its bottom to the chimney, these two ducts being so arranged that the air traversing the core may be preheated during its passage through the said core, and air passages disposed in the external walls of the kiln, opposite to the air passages with which the central core is provided and thus enabling the ring of material to be treated to receive air simultaneously at its external and at its internal periphery.

4. The combination with a vertical kiln or furnace, in which the material to be treated is mixed with the fuel, of a central core extending the whole length of the kiln and completely surrounded by the material and the fuel, this core having outwardly the shape of two opposed truncated cones, a duct in this core taking fresh air from the exterior and distributing it at different levels in the material to be treated and a second duct in this core taking the burned gases at the top of the kiln and bringing them at its bottom to the chimney.

In testimony whereof I affix my signature in presence of two witnesses.

ETIENNE CHAUDIÈRE.

Witnesses:
LEONARD HERVA,
ALFRED VAUDER HOUGHEY.